United States Patent [19]
Francke et al.

[11] 3,927,207
[45] Dec. 16, 1975

[54] METHOD FOR COMBATING INSECTS EMPLOYING CERTAIN KETONES

[75] Inventors: Wittko Francke, Reinbek; Volker Heemann, Hamburg, both of Germany

[73] Assignee: Amchem Products, Inc., Ambler, Pa.

[22] Filed: Nov. 6, 1973

[21] Appl. No.: 413,386

[30] Foreign Application Priority Data
Nov. 9, 1972 Germany............................ 2254697

[52] U.S. Cl.................................. 424/84; 424/331
[51] Int. Cl.$^2$......................................... A01N 17/14
[58] Field of Search............................... 424/84, 331

[56] References Cited
UNITED STATES PATENTS
2,974,086  3/1961  Beroza et al........................... 424/84

OTHER PUBLICATIONS
Chemical Abstracts, Vol. 75 (1971), p. 147085p.
Chemical Abstracts, Vol. 65 (1966), p. 5940a.

*Primary Examiner*—V. D. Turner
*Attorney, Agent, or Firm*—Cushman, Darby & Cushman

[57] ABSTRACT

Compounds of the following general formula are pheromonal attractants for combatting beetles of the families *scolytidae* and *platypodidae* in the order of *colcoptera*

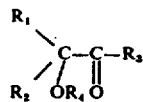

wherein $R_1$, $R_2$, $R_3$ are hydrogen, aliphatic saturated and/or unsaturated, open-chain or cyclic groups with 1 to 6 carbon atoms and/or aromatic groups, wherein the groups may contain one or more heteroatoms and/or functional substituents and wherein $R_4$ is hydrogen or an aliphatic saturated or unsaturated, open-chain or cyclic group with 1 to 6 carbon atoms or an acyl-group.

19 Claims, No Drawings

METHOD FOR COMBATING INSECTS EMPLOYING CERTAIN KETONES

The invention relates to a method for combatting insects by use of pheromones or ectohormones.

Pheromones or ectohormones are secreted by insects as so called socially active ingredients e.g., as sexual attractant or aggregation substance. The use of these pheromones or ectohormones is known to attract insects into certain small sections of a contaminated area, to concentrate them in this area and then to destroy the insects in any known way, e.g., mechanically, chemically or with insecticides. This method leads to a very economical and concentrated use of the actual insecticides, especially of insecticides which are ecologically dangerous; hereby the spraying of large parts of the contaminated area in an expensive way e.g. by spraying insecticides with an aeroplane, is avoided.

The pheromones known up to the present time belong to a large variety of chemical substances and are, as a rule, effective only with respect to a certain group of insects. Since pheromones are secreted only in amounts in a range of nanogrammes, there has been practically no research made in the area of pheromones and especially their use against certain insects.

It is an object of the present invention to employ certain pheromonally active attractants for combatting insects of the order *coleoptera* and the family *scolytidae* and *platypodidae*. These beetles cause substantial damage to a forest and to the wood of trees generally; up to now it was nearly impossible or very expensive to destroy these insects.

To solve this problem, the invention proposes the use of compounds of the following general formula as pheromonal attractants for combatting beetles of the order *coleoptera* and the families *scolytidae* and *platypodidae*, especially of bark-beetles and ambrosia beetles;

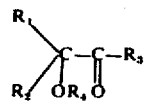

wherein $R_1, R_2, R_3$, are the same or different, are hydrogen, aliphatic saturated and/or unsaturated, open-chain or cyclic groups with 1 to 6 carbon atoms and/or aromatic groups, wherein the groups may contain one or more heteroatoms and/or functional substituents and wherein $R_4$ is hydrogen or an aliphatic saturated or unsaturated, open-chain or cyclic group with 1 to 6 carbon atoms or an acylgroup.

According to one aspect of the invention the use of alkyl hydroxy alkanones and of these the methyl-, ethyl-, propyl-, butyl-, pentyl-, and hexyl-hydroxyalkanones and the corresponding branched compounds is preferred. As far as alkanones are concerned, butanones and pentanones are suitable, especially 3-hydroxy-3-methyl-pentane-2-one, 3-hydroxy-3-ethyl-pentane-2-one, 3,5-dihydroxy-3-methyl-pentane-2-one, 3,5-dihydroxy-3-ethyl-pentane-2-one, 3,5-dihydroxy-3-(2-hydroxyethyl)-pentane-2-one, 4-hydroxy-4-acetyl-tetrahydropyran (±), β-hydroxy-β-acetyl-δ-valero-lactone.

The most preferred compound according to the invention is 3-methyl-3-hydroxybutane-2-one:

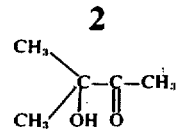

Preferably, these compounds are used in physical or chemical combination with insecticides. The attractants of the present invention are especially effective with respect to the following beetles:

Xyloterus (Trypodendron) domesticus (um) Linne
Xyloterus (Trypodendron) signatus (um) Fabricius
Anisandros dispar. Fabricius
Xyloterus (Trypodendron) lineatus (um) Oliver
Ips typrographus Linné.
Hylurgops palliatus Gyllenhall
Hylastes after Paykull
Dryocoetes autographus Ratzeburg The destruction of the insects can be achieved by distributing the pheromonal attractants in the contaminated area at separate individual places, namely by means of catch-trees. These are impregnated with the attractants and are sprayed with an insecticide either before or after the insects have gathered at the catch-tree; instead of an insecticide one may also use a chemical sterilizing compound; further the catch-tree may be treated with other chemicals or can be burned. Another possible method for destroying insects with the compounds according to the invention makes use of the disturbance or perturbance theory. Instead of physically destroying the insects it is also possible to combine the attractants chemically or physically with insecticides either by mixing the pheromones with insecticides or by combining compounds with insecticide activity or insecticide active radicals of chemical compounds with pheromones. In the latter case it may be possible to spray a combination of pheromones and insecticides in certain centrally located areas or in the form of rows in the contaminated area.

The pheromones can be mixed with the usual solid or liquid carriers or with biocides such as insecticides, pesticides or herbicides. The mixture may contain surface-active agents to obtain a better distribution or adherence to the plants.

The mixtures containing pheromones may contain other attractants, or aroma components typical of wood, to improve the attraction.

EXAMPLE 1

Field tests have been made each time using 100 male and 100 female beetles. The beetles were released at a certain distance from the source of attraction which had been treated with the mixtures according to the invention. Further, felled trees having already been contaminated with the respective beetles had been positioned at both sides of the starting point. After a certain period of time the amount of insects gathered at the source of attraction was determined thus indicating the effectiveness of the pheromonal mixture according to the invention.

Field tests with *Xyloterus domesticus* have been made, whereby the distance between the starting point and the source of attraction was 50 meters. Four independent field tests have been made, whereby 42 % of the male beetles and 46 % of the female beetles gathered at the catch-tree.

Three further field tests were made with *Xyloterus lineatus* under more severe conditions; the distance between the starting point and source of attraction was 35 meters, however, between these two points contaminated felled fir-trees had been arranged. The concentration of insects at the catch-tree was 56 % of male insects and 58 % of female insects. In all these tests the catch-tree was impregnated with a 0.1 % aqueous solution of 3-methyl-3-hydroxybutanone in a total amount of 50 mg.

EXAMPLE 2

During two consecutive days several slightly contaminated felled oak-trees with about 15 to 20 beetle bore-holes per m² were treated each with 250 mg of 3-methyl-3-hydroxybutanone in 0.1 % aqueous solution. These trees were exposed in an area which was slightly contaminated with *Xyloterus domesticus*. After 3 to 4 days 110 beetle bore-holes per m² were observed. Other untreated logs or trees in the direct neighbourhood of the treated logs or trees showed 50 beetle bore-holes per m² on the average, while other trees at a distance of 10 to 20 meters showed no contamination.

EXAMPLE 3

In a large test field, mixtures of 3-methyl-3-hydroxybutanone in admixture with different DDT preparations, fluorine containing mixtures and arsen containing mixtures, as well as hexyachloro-cyclohexane were used. These mixtures contained also small amounts of surface-active agents and carriers. The mixtures were applied to catch-trees namely logs of oak-trees in an area contaminated with *Xyloterus domesticus*. The distance between the catch-trees was always 200 meters. After 8 days, there was practically no further fresh contamination in an area of 8 meters of the respective catch-trees. About 84 % of the insects were destroyed. Surprisingly it was found that after the fourth day the attracting effect was not practically diminished in spite of dead insects being present.

What is claimed is:

1. A method of attracting beetles of the families *scolytidae* and *platypodidae* within the order *coleoptera* comprising applying to an area contaminated with said beetles an attractant having the formula

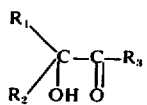

where $R_1$ is alkyl of 1 to 6 carbon atoms, $R_2$ is alkyl of 1 to 6 carbon atoms and $R_3$ is alkyl of 1 to 6 carbon atoms, said attractant being applied to said area in an amount sufficient to attract said beetles.

2. A method according to claim 1 wherein the attractant is 3-methyl-3-hydroxy-butanone-(2).
3. A method according to claim 1 wherein the attractant is 3-methyl-3-hydroxy-pentanone-(2).
4. A method according to claim 1 wherein the attractant is 3-ethyl-3-hydroxy-pentanone-(2).
5. A method according to claim 1 wherein the attractant is applied to wood in said area.
6. A method according to claim 1 wherein the beetles are bark beetles or ambrosia beetles.
7. A method according to claim 6 wherein the attractant is 3-methyl-3-hydroxy-butanone-(2).
8. A method according to claim 6 wherein the attractant is 3-methyl-3-hydroxy-pentanone-(2).
9. A method according to claim 6 wherein the attractant is 3-ethyl-3-hydroxy-pentanone-(2).
10. Wood treated with a pheromonal attractant for combatting beetles of the families *scolytidae* and *platypodidae* within the order *coleoptera*, said attractant having the formula

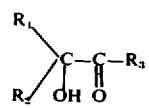

where $R_1$ is alkyl of 1 to 6 carbon atoms, $R_2$ is alkyl of 1 to 6 carbon atoms and $R_3$ is alkyl of 1 to 6 carbon atoms, said attractant being present in an amount sufficient to attract said beetles.

11. Wood according to claim 10 in the form of a tree treated with said attractant.
12. Wood according to claim 10 in the form of a log.
13. Wood according to claim 10 wherein the attractant is 3-methyl-3-hydroxy-butanone-(2).
14. Wood according to claim 10 in the form of a felled tree treated with said attractant.
15. Wood according to claim 10 in the form of a log wherein the attractant is 3-methyl-3-hydroxy-butanone-(2).
16. Wood according to claim 10 in the form of a log wherein the attractant is 3-methyl-3-hydroxy-pentanone-(2).
17. Wood according to claim 10 in the form of a log wherein the attractant is 3-ethyl-3-hydroxy-pentanone-(2).
18. Wood according to claim 10 in the form of a tree wherein the attractant is 3-methyl-3-hydroxy-pentanone-(2).
19. Wood according to claim 10 in the form of a tree wherein the attractant is 3-ethyl-3-hydroxy-pentanone-(2).

* * * * *